Figure 1:
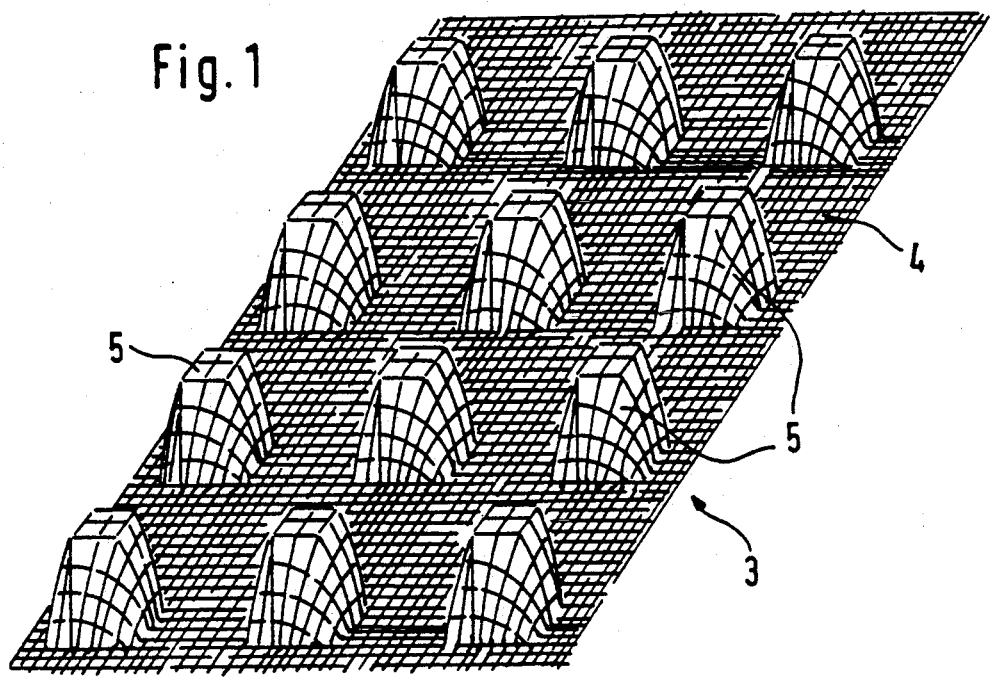

United States Patent [19]

Disselbeck et al.

[11] Patent Number: 5,114,812
[45] Date of Patent: May 19, 1992

[54] ELECTRODES FOR PRIMARY AND SECONDARY ELECTRIC CELLS

[75] Inventors: Dieter Disselbeck, Bad Soden am Taunus; Karl C. Berger, Bad Sassendorf; Jürgen Drews, Soest, all of Fed. Rep. of Germany

[73] Assignees: Hoechst Aktiengesellschaft; Hagen Batterie AG, both of Fed. Rep. of Germany

[21] Appl. No.: 549,899

[22] Filed: Jul. 9, 1990

[30] Foreign Application Priority Data

Jul. 7, 1989 [DE] Fed. Rep. of Germany ....... 3922425

[51] Int. Cl.⁵ .............................................. H01M 4/74
[52] U.S. Cl. .................................... 429/234; 429/243
[58] Field of Search ....................... 429/234, 241, 243

[56] References Cited

U.S. PATENT DOCUMENTS

| | | |
|---|---|---|
| 711,481 | 10/1902 | Daboll ............................ 429/241 X |
| 2,713,078 | 7/1955 | Gros et al. ........................... 429/241 |
| 3,476,604 | 11/1969 | Faber .............................. 429/241 X |
| 4,121,023 | 10/1978 | Parkinson et al. ............... 429/241 X |
| 4,476,206 | 10/1984 | Viala et al. .......................... 429/234 |
| 4,687,719 | 8/1987 | Von Benda et al. ................ 429/234 |

Primary Examiner—Stephen Kalafut
Attorney, Agent, or Firm—Connolly & Hutz

[57] ABSTRACT

An electrode for primary or secondary electric cells comprises a support and an active material, the support being an electrically conductive network material which extends skeletally throughout the active material.

9 Claims, 1 Drawing Sheet

ELECTRODES FOR PRIMARY AND SECONDARY ELECTRIC CELLS

Electrodes for primary and secondary electric cells The electrodes of electric cells, in particular electrochemical storage devices, consist of negative active material supported by a support material. Customary support materials in secondary batteries are metallic grids of various designs. The latest developments may incorporate for example a lead-plated grid of copper instead of a hard lead grid. These and similar measures, including for example the incorporation of conductive fibers into the active material, make it possible to achieve progress in respect of the energy density, but they still make it desirable to further improve the performance characteristics of primary and secondary electric cells. It is an object of the present invention to provide improved electric cells, in particular secondary cells of reduced weight.

This object is achieved by the present invention by forming the electrodes of electric cells from a three-dimensionally deformed, dimensionally stable, conductive network material based on a preferably deep-drawable, possibly resinified textile material and from an active material, the active material being penetrated three-dimensionally and skeletally by the electrically conductive network material.

The adjective "deformed" describes for the purposes of the present invention the three-dimensional geometrical shape of the network material. It does not imply that the material must have been produced by a process of deformation.

A network material which, although electrically nonconductive, corresponds in its geometry to the network material present in the electrodes according to the present invention is known from EP-A-158,234. Its essential feature is a three-dimensional network of rods, nodes and voids, so that it can be penetrated by other materials, for example an active electrode material. The electrical conductivity of the network material used according to the present invention can be brought about by electroplating, electroless metallization, the incorporation of metal filaments into the textile base area or else by the addition of metal flakes or other electrically conducting fillers to the stabilizing resin which may be present in the network material.

The open mesh nature of the filigreelike net structure of the electrically conductive network material according to the present invention is a characteristic geometric feature of said material. The open mesh structure is formed for example by deep-drawing a sheetlike textile mesh material, for example a cross-laid fabric stabilized by extensible weft threads, a Raschel fabric or a woven fabric, but in particular a knitted fabric. If the base material used for the network material according to the present invention is a cross-laid fabric in which the filament bundles cross at about an angle of from 5° to 30°, or a woven fabric, it is necessary that the sheetlike textile material should consist of—or at least contain in an effective amount—fibers which themselves show a relatively high reversible or irreversible extensibility, so that the material be sufficiently deepdrawable. A fiber material of high irreversible extensibility consists for example of partially oriented filaments which are produced by spinning at a relatively high takeoff speed. In the case of knitted fabrics, by contrast, the deep-drawability is substantially independent of the extensibility of the fiber material. It is therefore preferable to use a knitted fabric as the basis for manufacturing the electrically conductive network materials according to the present invention. The fiber material of the sheetlike textile materials is in principle of minor importance. However, it is best selected in such a way that it promises to meet the intended use in the best possible manner. Whereas the physical properties of natural fibers can be influenced only to a limited extent, the physical properties of synthetic fibers can be optimized to the intended use. It is therefore particularly preferable to use synthetic fiber materials, for example polyamides, polyacrylonitrile and polyolefin fibers but in particular polyester materials, for manufacturing the electrically conductive network materials according to the present invention. Particular preference is given here in turn to those grades which exhibit a particularly high mechanical strength. An example of such fiber materials is the commercial high-tenacity product TREVIRA ® hochfest or else end-group-capped polyester materials which are particularly resistant to chemical influences. The three-dimensionally deformed, electrically conductive network materials are preferably dimensionally stabilized by an impregnation of the textile material with a thermoplastic or thermosetting resin, in particular if the network materials consist of a fiber material of reversible extensibility.

If a partially oriented fiber material having a relatively low softening point is used, it is possible to dispense with a separate resin impregnation since the thermoplastic filament material itself performs the function of thermoplastic resin. Accordingly, dimensional stabilization by a thermoplastic for the purposes of the present invention also includes the dimensional stabilization achieved by softening the thermoplastic filaments of the deformed sheetlike textile material.

If a reversibly deformable fiber material is used for manufacturing the network material by deep-drawing or in the manufacture of the network material by a process other than deep-drawing, for example by a specific weaving technique, it is likewise possible to dispense with a resinification with a thermoplastic or thermosetting resin, since the subsequent metallization brings about a stabilization of the network structure.

The dimensionally stabilizing resins which may be present in the network materials can belong to the various known thermoplastic or thermosetting resins so long as their mechanical properties permit the dimensional stabilization of the network materials according to the present invention. Examples of suitable thermoplastic resins are polyacrylates and polyvinyl chloride; however, the preferred resins are thermosetting resins, for example melamine and in particular phenolic resins.

The amount of resin present in the three-dimensionally deformed network materials is adapted to the weight of the textile material in such a way that deep-drawing of the sheetlike textile material causes the mesh structure to open up to form a filigree network. Suitable addon levels range from 50 to 100, preferably from 100 to 300, g of resin/m$^2$ of the unstretched textile material. Within these specified ranges the amount of resin is advantageously also adapted to the square meter weight of the deep-drawable textile material. Thus, if a heavyweight textile material is used, the amount of resin employed will be in the upper half of the specified ranges, while in the case of lightweight textile materials it will be within the lower half. The pivotal criterion is, as stated above, the condition that on deep-drawing the mesh structure of the textile material should open up to form a network.

The three-dimensionally deformed network material according to the present invention exhibits a multiplicity of deformations which extend at least in one direction which has a component perpendicular to the original plane of the textile sheet material from which the network material according to the present invention was produced.

In a specific embodiment which is particularly useful for a later use as a skeleton material for the manufacture of electrodes, the network material according to the present invention exhibits a multiplicity of elevations in a regular pattern on a base area. In a further embodiment, the network material according to the present invention exhibits a multiplicity of elevations and depressions in a regular pattern on the plane of the original base area. The elevations and depressions can take the form of wells having a round or angular base area or for example the form of webs. The elevations and depressions, however, may also have other shapes from case to case, for example the shapes of cones or truncated cones, pyramids or truncated pyramids having different polygonal bases, cylinders, prisms, spherical segments, etc. It is also particularly preferable if the apex points or areas of the elevations are all within one plane and parallel to the base area, which mutatis mutandis also applies to the depressions.

It is also of advantage if the number, size, shape and spatial arrangement of the deformations per unit area of sheet material are selected in such a way as to maximize the arithmetic product of the size of the area remaining after the deformation of the original plane and the size of the top surfaces of the elevations or the product of the size of the top surfaces of the elevations and the bottom surfaces of the depressions.

It is further of advantage if the number, size, shape and spatial arrangement of the deformations per unit area of sheet material are selected in such a way as to offer an optimum degree of adhesion to the particular active material used, regardless of its porosity or other consistency.

Figure 2:
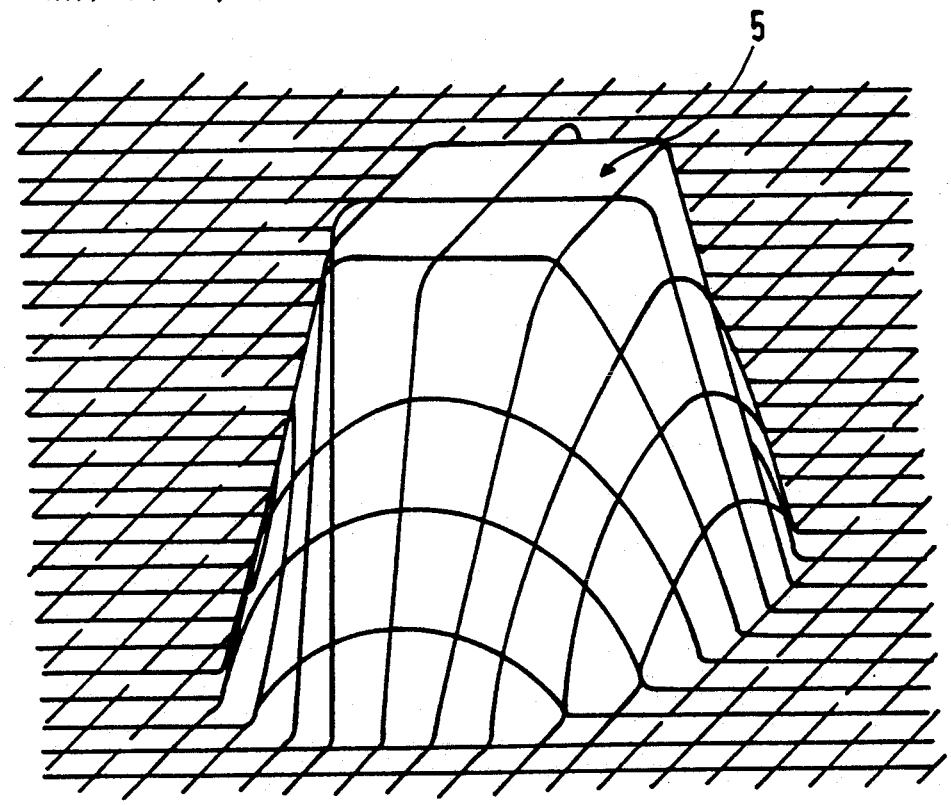

FIG. 1 shows schematically a section of a network material 3 with a multiplicity of hat-shaped elevations (5) on a base area (4). FIG. 2 schematically depicts in enlargement one of the hat-shaped deformations and clearly shows the dramatic widening of the mesh structure of the textile material which occurs in the area of the deformation.

The network material to be used according to the present invention may of course also exhibit other three-dimensional deformations. It is also entirely possible for the surface of the original textile material to disappear completely in the three-dimensionally deformed network material according to the present invention if, for example, the material is deep-drawn with rams from both sides of the textile sheet material in such a way that well- and hat-shaped deformations alternate up and down in the material or if the original textile sheet material is pulled out from both sides by a multiplicity of narrow rams which extend in the same longitudinal direction to form a zig-zag surface and is stabilized in this form.

The above-described process for producing the network material present in the electrodes according to the present invention by deep-drawing a deep-drawable, sheetlike textile material represents a particularly advantageous possibility for carrying out the present invention.

However, the network material can of course also be produced using other shape-conferring processes, for example specific weaving processes, which are suitable for manufacturing a possibly resin-stabilized textile material which, as described above, shows three-dimensional deformation and has the characteristic open-mesh net structure of a network material producible by deep-drawing.

The electrical conductivity of the network material can basically be brought about in various ways. For instance, the network material can be produced starting from sheetlike textile materials whose threads contain metal wires. Depending on the desired conductivity, the underlying threads or yarns may contain up to 50% by weight or preferably from 1 to 10% by weight, of flexible metal filaments, for example very fine copper wires.

A further way of bringing about the electrical conductivity of the network material consists in admixing the stabilizing resin with an electrically conductive filler, for example a metal powder, metal fibers or else, for example, graphite. The proportion of electrically conductive filler relative to the resin is limited in the upward direction only by the condition that the filled resin must still ensure sufficient penetration of the textile threads and stabilization of the net structure and that the porosity of the net structure be preserved.

Optimal results in respect of conductivity are obtained by metallizing the surface of the network material. Network materials having a metallized surface are therefore preferred in the electrodes according to the present invention.

The electrically conductive surface of the metallized network material consists of a thin coating of metal which is firmly adherent to the resinized or non-resinized textile material. The thickness of the superficial coating of metal is within the range from 5 to 300, for example from 20 to 100, $\mu$m.

In particular, the metallic coating on the network materials according to the present invention is formed by metals which, in the electrochemical series, have a standard potential with reference to hydrogen of from $-1.3$ to $+1.6$, preferably from $-0.8$ to $+1.6$, V.

The electrically conductive coating of metal on the network material according to the present invention can consist of one or more coats; for instance, a first coat of copper may be followed by a very thin coat of a noble metal, or a relatively thin coat of copper or nickel may be followed by a thicker coat of another metal, for example silver, lead, tin, gold or a platinum metal.

The electrically conducting coating of metal on the network material according to the present invention can also consist of a mixture of various metals, preferably those which form alloys with one another.

The first coat of the metallic coating on the network material according to the present invention making up the electrodes according to the present invention is preferably made of copper, nickel, silver, gold or a platinum metal, although in particular gold or platinum metals may also be applied as topcoats on a basecoat formed from one of the aforementioned metals, in particular copper or nickel. Preferably, the coat next to the polymer material of the network material is a relatively thin coat of gold, nickel or in particular copper, to which further thicker coats of one or more other metals are applied; in the case of lead batteries, further coats preferably consist of lead, tin or lead/tin.

One way of producing the three-dimensionally deformed electrically conductive network material consists in first impregnating the sheetlike, deep-drawable textile material whose threads may contain metal filaments, preferably the knitted material, with one of the above-mentioned resins suitable for the mechanical stabilization of the deformations, which may be filled with an electrically conductive filler. The resins can be applied to the textile material in a conventional manner by brushing, rubbing, knife-coating, padding or particularly advantageously by dipping. The resin-coated fabric is then advantageously squeezed off with a pair of squeeze rolls with the desired resin pickup.

Thermoplastic resins are advantageously applied in the form of solutions or preferably emulsions for the impregnating step. Heat-curable or thermosetting resins are advantageously applied in the commercial form as highly concentrated aqueous solutions or dispersions.

After a possible intermediate drying of the resin-impregnated textile material, it is subjected to the process of deep-drawing at elevated temperature. The deep-drawing temperature is chosen in such a way that thermoplastic resins can be melted and completely penetrate the filaments of the net structure. The same is true of thermosetting resins. In this case the temperature of the deep-drawing means is adjusted in such a way that the flowable domain of the thermosetting resin is reached. After the resin has melted, the temperature of the deep-drawing means is controlled in such a way that the impregnating resin can harden. If thermoplastics are used, this requires the temperature to be reduced to below the melting point of the thermoplastics; in the case of thermosetting resins, the temperature of the deep-drawing apparatus can in general remain unchanged since the hardening of thermosetting resins also takes place at elevated temperature. The deep-drawing means is kept closed until the stabilizing resin is completely hard and the structure of the fiber material produced by deep-drawing remains stable.

After the three-dimensionally deformed network material has been produced, it is metallized at the surface. To this end, the material is prepared for the actual metallization in a conventional manner by activation with a noble metal ion solution or a noble metal colloid, with or without a subsequent acceleration treatment in an aqueous acid, for example hydroborofluoric acid, sulfuric acid, hydrochloric acid or oxalic acid. This is followed by the deposition of a coating of metal, for example a coating of copper, nickel or gold, on the thus pretreated network material. The deposition of a metal is effected by treating the pretreated network material with an aqueous solution containing the metal ions in question and a reducing agent, in practice usually formaldehyde, a hypophosphite or an alkali metal boranate.

Thereafter, if desired, the chemically deposited coat of metal may be covered with a further coat of the same or another metal, deposited in a conventional manner by electrolysis.

In specific cases, for example if so required by the plastics surface of the network threads or if particularly high demands are placed on the adhesion of the metallic coating, it is advantageous to prepare the network material for activation by treatment with a swelling agent, for example acetone, ethyl acetate, trichloroacetone or trichloroacetic acid, and pickling with an aqueous solution which customarily contains from 300 to 900 g/l of chromic acid with or without sulfuric acid. It is particularly surprising that this swelling and pickling treatment can in general be dispensed with in the metallization of the network materials.

Preferably, the activation of the network material is preceded by a thorough cleaning of the surface. This can take the form for example of a treatment with an aqueous alkaline surfactant solution, for example a commercially available conditioner. A clean in a hot (40°–70° C.) water bath under the action of ultrasound has proved particularly advantageous. Here the use of deionized water is particularly advisable.

The network material can be exclusively metallized to the desired thickness of the coating of metal by the above-described chemical technique. Here the thickness of the coat of metal naturally depends on the length of time the network material is exposed in the metallizing bath. In general, about 2–6 $\mu$m of metal film can be deposited per hour.

Preference is given to the chemical production of a metal film of copper or nickel in a thickness of 0.5 to 2 $\mu$m and a subsequent electrolytic metallization, for example with chromium, copper, nickel, lead, lead/tin, tin, gold or a platinum metal, preferably with copper, nickel, lead, tin, a lead/tin mixture or gold, up to a metal coating thickness of up to 300, preferably from 50 to 100, $\mu$m.

If a combined chemical and electrolytic metallization is carried out, particular preference is given to the chemical deposition of a copper film, because copper is very ductile and has a particularly readily activated surface.

To manufacture the electrodes according to the present invention, the active material is introduced into the skeleton of the network material. To this end it is possible to use any active material preparable with a pasty or creamy consistency. In particular in the manufacture of electrodes for lead batteries it is possible to use a basic material having a density from 3 to 5.7 g/ml. This paste can be pasted in either by hand or by machine. To improve the distribution of the active material, the use of ultrasound for the transient liquefication of the active material is possible.

In particular in the case of dense networks it is of advantage to apply the paste from both sides in order to ensure complete envelopment of all the network parts. Furthermore, complete encasement of a dense network can be effected by using more liquid mixtures and subsequently squeezing off with an absorbent web material which is later used as an acid reservoir in the ready-produced cell.

The structure of the electrodes according to the present invention ensures essentially that they have a lower weight, a higher power rating and a higher mechanical strength. The lower weight compared with known embodiments is the result of the fact that the conductive network support consists in the main of synthetic filaments and resins, possibly with a thin coat of metal. In the preferred embodiment, the filament material is polyester having a specific gravity of about 1.4 g/cm$^3$. Similarly, the preferred resin has a density of about 1.4 g/cm$^3$. By comparison, lead has a specific gravity of 11.3/cm$^3$ and a lead grid used as a support for the active material, for example in a starter battery, has a weight of 90 gram. If the support for the active material consists of the above-described network material, the weight saved in the case of an 88 Ah starter battery is from one to two kilograms.

The crucial aspect of a starter battery is its starting power, i.e. the high current dischargability of the battery. This power rating is decisively determined by the internal resistance of the battery, which in turn depends on the plate thickness which, if a network material is used, is no longer subject to the casting restrictions of prior art grids. Since, in addition, the active material is skeletally pervaded by the filigree structure of the network, the distribution of a cross current is improved and so is the utilization of the active material.

The reduced voltage drop in the cell also reduces the amount of heat lost. This has a beneficial effect on battery life.

In total, the use of the conductive plastics network material results in a higher energy density per unit weight compared with conventional designs based for example on lead/acid-Ni/Cd or Ni/Fe cells.

Compared with conventional electrode plates, those formed from network materials also have the advantage of greater mechanical stability. Owing to its structure, the network material not only supports the active material but also pervades it three-dimensionally like a skeleton and reinforces and stabilizes it in this manner against impact and shock. This in turn reduces the risk of active material dropping off the support and accumulating as sludge on the bottom of the battery and reducing the performance of the battery or making it unusable.

We claim:

1. An electrode for primary and secondary electric cells comprising an active material and a grid plate which acts as support for the active material and conducts current to and from the active material, the grid plate comprising an electrically conductive network material which forms a three dimensional structure provided with humplike depressions and/or elevations distributed over its areas and in whose areas the distance between the plastics filaments is increased, the grid plate extending skeletally throughout the active material.

2. The electrode as claimed in claim 1, wherein the grid plate comprises a deformed textile sheet material with an open network structure which is dimensionally stabilized by a thermoplastic or thermosetting resin and is electrically conducting.

3. The electrode as claimed in claim 1, in particular a negative electrode for secondary batteries, wherein the metal coated plastics network has been coated with at least one further coating of a lead-tin alloy or of lead.

4. The electrode as claimed in claim 3, wherein the further coating of a lead-tin alloy is 20-90% lead, (remainder tin) and has a thickness of from 5 to 20 $\mu$m.

5. The electrode as claimed in claim 3, wherein the readily conducting coat of metal has had applied to it a coat of lead in a thickness of 30-70 $\mu$m.

6. The electrode as claimed in claim 3, wherein the further coating has been applied by dipping into a melt of the coating metal.

7. The electrode as claimed in claim 6, wherein the dip times during which the network is in the melt are so short that the melting point of the plastics material making up the plastics network is not exceeded.

8. The electrode as claimed in claim 7, wherein the temperature of the melt is from 500 to 600° K. and the dip time is from 1 to 4, sec.

9. The electrode as claimed in claim 3, wherein said conductive network material consists of plastic filaments coated with a readily conductive thin coat of metal, and all the metallizations are carried out following a shape-conferring process.

* * * * *

UNITED STATES PATENT AND TRADEMARK OFFICE
CERTIFICATE OF CORRECTION

PATENT NO. : 5,114,812
DATED : May 19, 1992
INVENTOR(S) : Dieter Disselbeck et al It is certified that error appears in the above-indentified patent and that said Letters Patent is hereby corrected as shown below:

Column 1, line 7, before "negative" insert --a positive or--.

Signed and Sealed this

Twentieth Day of July, 1993

Attest:

MICHAEL K. KIRK

Attesting Officer     Acting Commissioner of Patents and Trademarks